(12) United States Patent
Dunmire

(10) Patent No.: US 6,546,946 B2
(45) Date of Patent: Apr. 15, 2003

(54) SHORT-LENGTH REDUCED-PRESSURE BACKFLOW PREVENTOR

(75) Inventor: Charles W. Dunmire, Fresno, CA (US)

(73) Assignee: United Dominion Industries, Inc., Charlotte, NC (US)

( * ) Notice: Subject to any disclaimer, the term of this patent is extended or adjusted under 35 U.S.C. 154(b) by 0 days.

(21) Appl. No.: 09/948,254

(22) Filed: Sep. 7, 2001

(65) Prior Publication Data

US 2002/0062868 A1 May 30, 2002

Related U.S. Application Data

(60) Provisional application No. 60/230,642, filed on Sep. 7, 2000.

(51) Int. Cl.[7] ............................................... F16K 15/02
(52) U.S. Cl. .............................. 137/15.18; 137/315.33; 137/512
(58) Field of Search ........................... 137/15.18, 218, 137/269, 315.33, 512, 613, 614.2

(56) References Cited

U.S. PATENT DOCUMENTS

| | | | |
|---|---|---|---|
| 570,727 A | 11/1896 | Gale | |
| 828,595 A | * 8/1906 | Bonser | ........................ 137/243 |
| 840,877 A | 1/1907 | Steedman | |
| 1,779,878 A | 10/1930 | Gundal | |
| 1,960,144 A | * 5/1934 | Entriken | ........................ 137/218 |
| 1,993,195 A | 3/1935 | Temple | ........................ 121/40 |
| 2,008,125 A | 7/1935 | Bailey | ........................ 277/46 |
| 2,586,942 A | 2/1952 | Grove | ........................ 137/78 |
| 4,231,387 A | * 11/1980 | Dixon | ........................ 137/218 |
| 4,244,392 A | 1/1981 | Griswold et al. | ........................ 137/218 |
| 4,333,495 A | 6/1982 | Griswold et al. | ........................ 137/484.2 |
| 4,945,940 A | 8/1990 | Stevens | ........................ 137/218 |
| 4,991,622 A | 2/1991 | Brewer et al. | ........................ 137/512 |
| 5,207,242 A | 5/1993 | Daghe et al. | ........................ 137/454.6 |
| 5,226,441 A | 7/1993 | Dunmire et al. | ........................ 137/15 |
| 5,385,166 A | * 1/1995 | Dunmire et al. | ........................ 137/15.18 |
| 5,551,479 A | 9/1996 | Graves | ........................ 137/614.2 |
| 5,584,315 A | 12/1996 | Powell | ........................ 137/315 |
| 6,021,805 A | 2/2000 | Horne et al. | ........................ 137/375 |
| 6,192,933 B1 | 2/2001 | Engelmann | ........................ 137/613 |

* cited by examiner

*Primary Examiner*—Michael Powell Buiz
*Assistant Examiner*—Ramesh Krishnamurthy
(74) *Attorney, Agent, or Firm*—Baker & Hostetler LLP

(57) ABSTRACT

A double check valve reduced pressure backflow preventor assembly is configured to have a relatively small length, volume and/or weight. The assembly defines parallel, preferably coaxial, inlet and outlet directions. In one aspect, first and second check valves are at an angle, preferably of 90°, to the in-line axis and preferably intersect the in-line axis. In one aspect, a relief valve is positioned spaced from the in-line axis. First and second shutoff valves are enclosed in the same integral, unitary housing which encloses the check valves and, preferably, some or all of the relief valve. The shutoff valves are preferably positioned along the in-line axis.

28 Claims, 7 Drawing Sheets

SHORT-LENGTH REDUCED-PRESSURE BACKFLOW PREVENTOR

CROSS REFERENCE TO RELATED APPLICATION

Priority is claimed from U.S. Provisional Application Ser. No. 60/230,642 filed Sep. 7, 2000 entitled "Short-Length Reduced-Pressure Backflow Preventor," which is incorporated by reference herein in its entirety.

FIELD OF THE INVENTION

The present invention relates to a reduced pressure backflow preventor valve assembly and in particular to a backflow preventor having a relatively short length.

BACKGROUND INFORMATION

Backflow preventors are generally provided for allowing flow of water (or other fluid) from a source (such as a city water source) into a service location (such as a building) and ultimately to a use location. The backflow preventor valve, however, prevents flow of a fluid in the opposite direction (e.g., for avoiding contamination of a city potable water supply, and the like). A number of configurations can be used for avoiding backflow including a vacuum breaker system and a double check valve system. In many situations, municipal building codes and the like require use of a double check valve system. In a double check valve system, the fluid, in normal use, flows through the (normally open) first valve, into a zone between the two check valves and then flows through the (normally open) second check valve. A relief valve coupled to the zone is normally closed. During normal use, the zone is maintained at a pressure lower than the inlet pressure. In general, if there is a pressure at the outlet which is not at least a predetermined amount lower than the pressure at the inlet, the check valves will close, preventing backflow. If abnormal conditions arise, in which there is no flow, or reversal of flow, and the second check valve is in a failed state, the differential release valve will open and discharge to maintain the zone at a pressure lower than the supply. When normal flow resumes, the zone's differential pressure will resume and the relief valve will close.

Backflow preventor valves are commonly used (and often required) at a service connection, such as the connection from a city water supply to a building water inlet. Often, such service connection backflow preventors must accommodate relatively high pressures (such as about 250 psi or more) and typically provide backflow prevention for relatively large-diameter fluid lines such as substantially greater than one inch inside diameter fluid lines.

In some situations, relatively smaller backflow preventor assemblies are called for. For example, point of use backflow preventors, which typically connect a water (or other fluid) use station to conduits within a building (e.g., as opposed to a service connection, directly connecting to a building water supply) are often relatively lower pressure (such as less than about 200 psi, often less than about 150 psi) and relatively smaller diameter (such as about one inch or less inside diameter, often three-quarter inch or less, or one-half inch or less). Non-exhaustive examples of point-of-use applications for backflow preventors include assemblies used to protect against high hazard (toxic) fluids in, e.g., beverage dispensers, industrial plants, hospitals, dental offices, morgues, mortuaries, chemical plants, irrigation systems, boiler feed and the like.

Some previous approaches to point of use backflow preventors are believed to have represented merely scaled-down versions of service connection (or other relatively large) backflow prevention assemblies. It is believed that previous approaches have not generally taken advantage of the opportunities presented by the fact that the devices are relatively low-pressure, low-diameter applications and, at least partially as a result, previous devices have tended to be undesirably large (including undesirably long, i.e., measured from the plane of the inlet opening to the plane of the outlet opening) heavy, and expensive to design, install, repair, maintain and/or replace. In addition, the relatively large size of previous approaches has made it infeasible to install such devices in relatively small spaces or volumes. Accordingly, it would be useful to provide a double check valve backflow preventor assembly having a relatively small size (including small length and/or small volume), lightweight and low-cost compared to typical previous backflow prevention assemblies, particularly previous small-diameter/low-pressure devices.

Many previous backflow preventors are configured with inlet and outlet openings which are substantially non-parallel and/or non-coaxial and/or provide flow in opposite directions with respect to one another. In many applications, this means that additional fittings are required for installation in an in-line situation (which is common in point-of-use applications) undesirably adding to the cost of design, installation, maintenance and the like, as well as potentially increasing the size or volume of the device as installed. Accordingly, it would be useful to provide a backflow prevention assembly with inlet and outlet openings which are parallel, preferably coaxial and define flow in the same direction with respect to one another.

Many previous backflow preventors are configured such that servicing, repair maintenance and the like is performed in a plurality of positions or directions (such as providing top or front access to a first valve and bottom or rear access to second valve, and the like). Such a configuration is believed to be inconvenient in many situations, especially in point of use applications where the available space or volume for accommodating access to a backflow preventor for maintenance and the like is typically severely limited. Accordingly, it would be useful to provide a backflow preventor assembly in which a plurality of components, and preferably at least both check valves, can be accessed for repair or maintenance from a single location or direction.

In addition, a backflow preventor assembly generally includes (an often is required, by code, to include) an upstream stop valve and downstream stop valve. Such stop valves can be used, e.g., for shutting-off flow in the event of failure of the check valves and/or relief valve or for facilitating maintenance or repair operations. Accordingly, a typical reduced pressure, double check valve backflow preventor assembly will include first and second check valves, first and second stop valves and a relief valve.

In many previous backflow prevention assemblies, at least some of the components were provided having a separate housing or enclosure, thus requiring installation of bolts through flanges or other coupling devices in order to achieve the desired total assembly. Such coupling devices typically add to the volume, length and/or weight of the total assembly. Accordingly, it would be useful to provide a backflow prevention assembly in which substantially all components, preferably including at least first and second check valves, first and second stop valves and a relief valve, are substantially enclosed using a single housing without the need for a coupling device.

Many previous check valve assemblies provided for installation or removal of some or all constituent components using devices which generally require hand and/or power tools (such as wrenches, screwdrivers, nutdrivers and the like), typically involving inserting or removing bolts, nuts, screws and the like. Without wishing to be bound by any theory, it is believed that this type of assembly/disassembly approach was provided for accommodating or withstanding the forces and pressures found in typical high pressure service connection devices. In general, it is believed that assembly devices and procedures which require the use of tools can lead to relatively high costs of fabrication, assembly, maintenance and repair of backflow prevention assemblies, and may be infeasible in situations where the room volume which is available for accommodating tools and the like is limited (e.g., as is common for point of use applications). Accordingly, it would be useful to provide a backflow prevention assembly which can, compared to previous approaches, reduce the number of components requiring tools for fabrication, assembly, disassembly service, maintenance repair and the like such as by providing at least some components which are readily assembled by hand (without the need for tools).

SUMMARY OF THE INVENTION

The present invention includes a recognition of the existence, nature and/or source of problems in previous approaches, including as described herein.

In one aspect, the present invention provides an in-line, reduced-pressure double check valve backflow preventor assembly with first and second serial check valves having valve movement axes which are both positioned substantially greater than 45°, preferably about 90° to the in-line axis. The in-line axis lies along the substantially coaxial inflow and outflow directions of the assembly. Preferably, each of the movement axes of the two check valves substantially intersect (and are preferably substantially perpendicular to) the in-line axis. In one aspect, the first and second check valves are positioned such that the direction of flow through the first check valve is substantially parallel to, but opposite in sense, to the direction of flow through the second check valve. In one aspect, a relief valve defines a longitudinal axis which does not intersect the in-line axis and is preferably substantially parallel to, but offset from, a plane common to the axes of the two check valves. In one embodiment, first and second shutoff valves, which are preferably ball valves, are positioned in a common housing with at least the first and second check valves, and are preferably positioned on the in-line axis. In one embodiment, a double check valve, reduced-pressure backflow preventor assembly, including a relief valve with integrated shutoff valves connectable, in-line, to one-half inch inlet and outlet conduits, and having a maximum working pressure of about 150 psi has a length (distance between plane of the inlet opening and the plane of the outlet opening) less than about 200 millimeters, preferably less than about 195 millimeters even more preferably less than about 185 millimeters, and a weight less than about 2 kilograms, preferably less than about 1.8 kilograms. Preferably, the assembly has a head loss of less than about 22 psi at a flow of about 10 gallons per minute.

In one aspect, a double check valve reduced pressure backflow preventor assembly is configured to have a relatively small length, volume and/or weight. The assembly defines parallel, preferably coaxial, inlet and outlet directions. In one aspect, first and second check valves are at an angle, preferably of 90°, to the in-line axis and preferably intersect, the in-line axis. In one aspect, a relief valve is positioned spaced from the in-line axis. First and second shutoff valves are enclosed in the same integral, unitary housing which encloses the check valves and, preferably, some or all of the relief valve. The shutoff valves are preferably positioned along the in-line axis.

DETAILED DESCRIPTION

Figure 1:
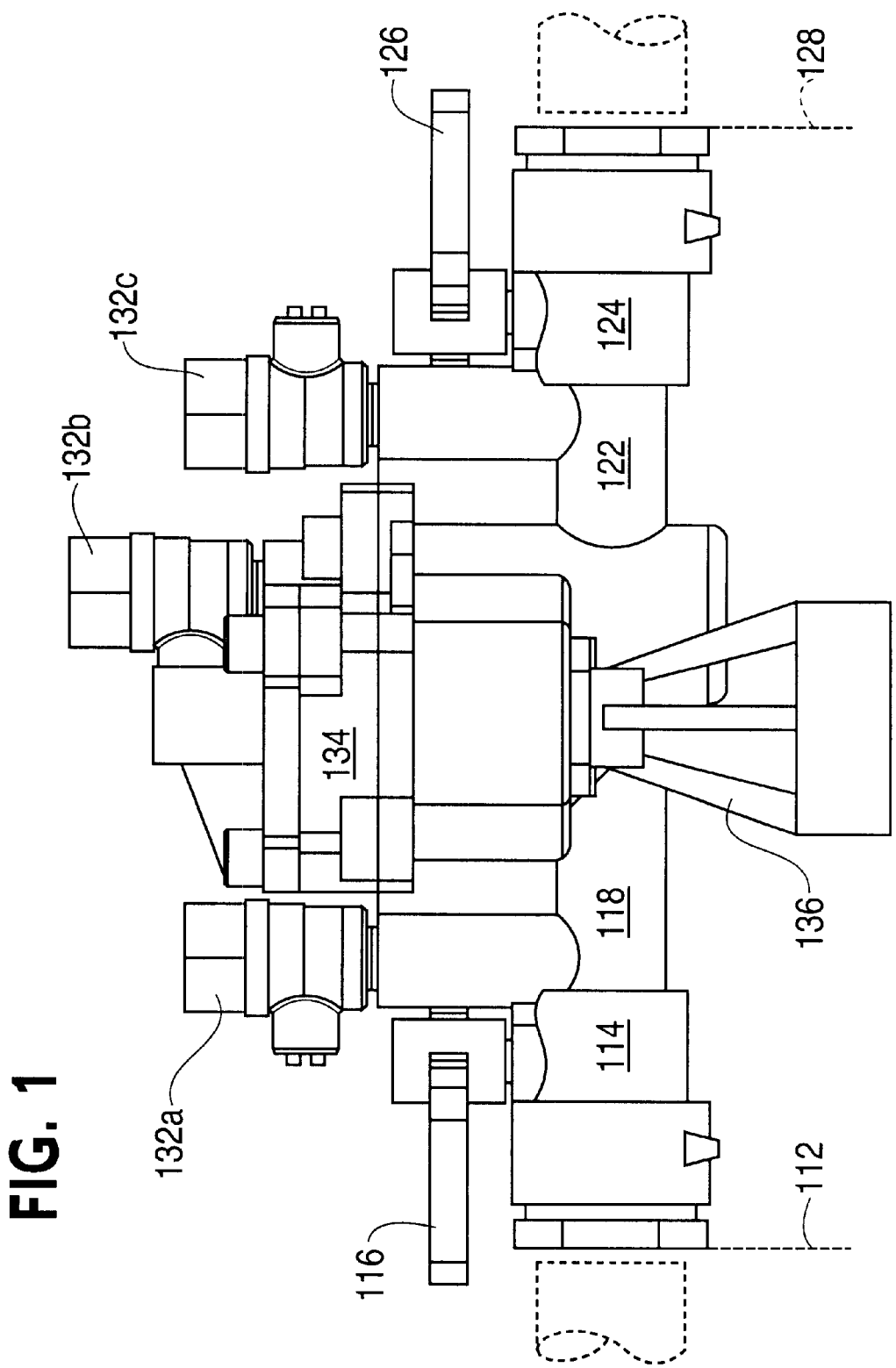
FIG. 1 is a front elevational view of a backflow preventor assembly according to an embodiment of the present invention.
Figure 3:
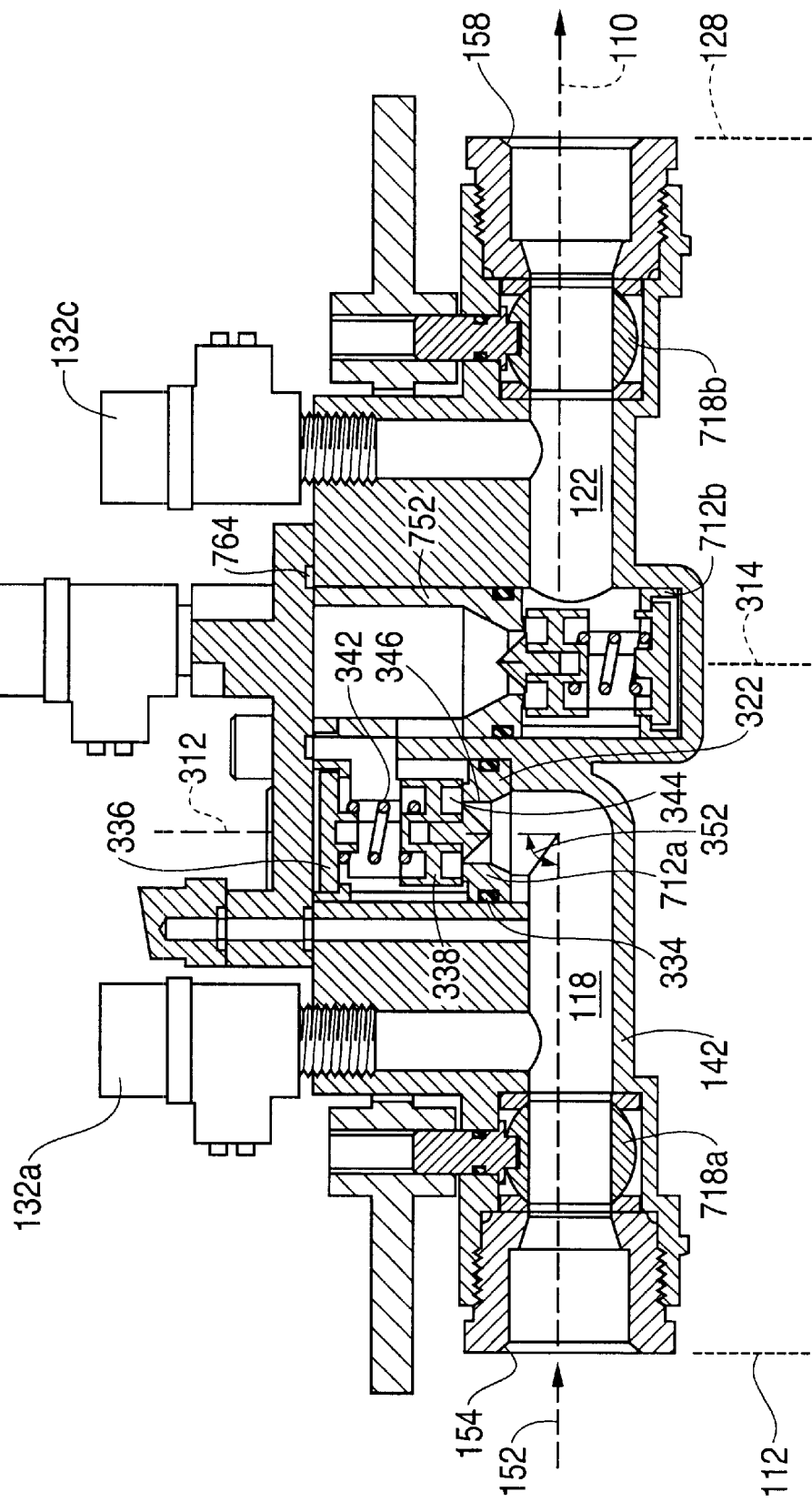
FIG. 3 is a cross-sectional view taken along line 3—3 of FIG. 2.

In the embodiment depicted in FIG. 1, an inlet opening defining an inlet opening plane 112 is in fluid communication with a first shutoff valve body 114 controlled by a handle or lever 116. A body conduit 118 provides for fluid to a first check valve having a first check valve movement axis 312 (FIG. 3). The first check valve is movable from the closed valve configuration depicted in FIG. 3 to a normally open (i.e., open during normal use) configuration depicted in FIG. 4. The fluid passing therethrough passes laterally 412 to a second check valve defining a second check valve axis 314. The fluid passes through the second check valve and to a second conduit 122 leading to a second stop valve body 124 controlled by a second lever or handle 126, whence the flow can exit through an outlet opening defining an outlet opening plane 128. Test cocks 132a,b,c can be used for calibration, maintenance purposes and the like. A relief valve module 134 provides controllable outlet to an air gap drain 136.

Figure 7:
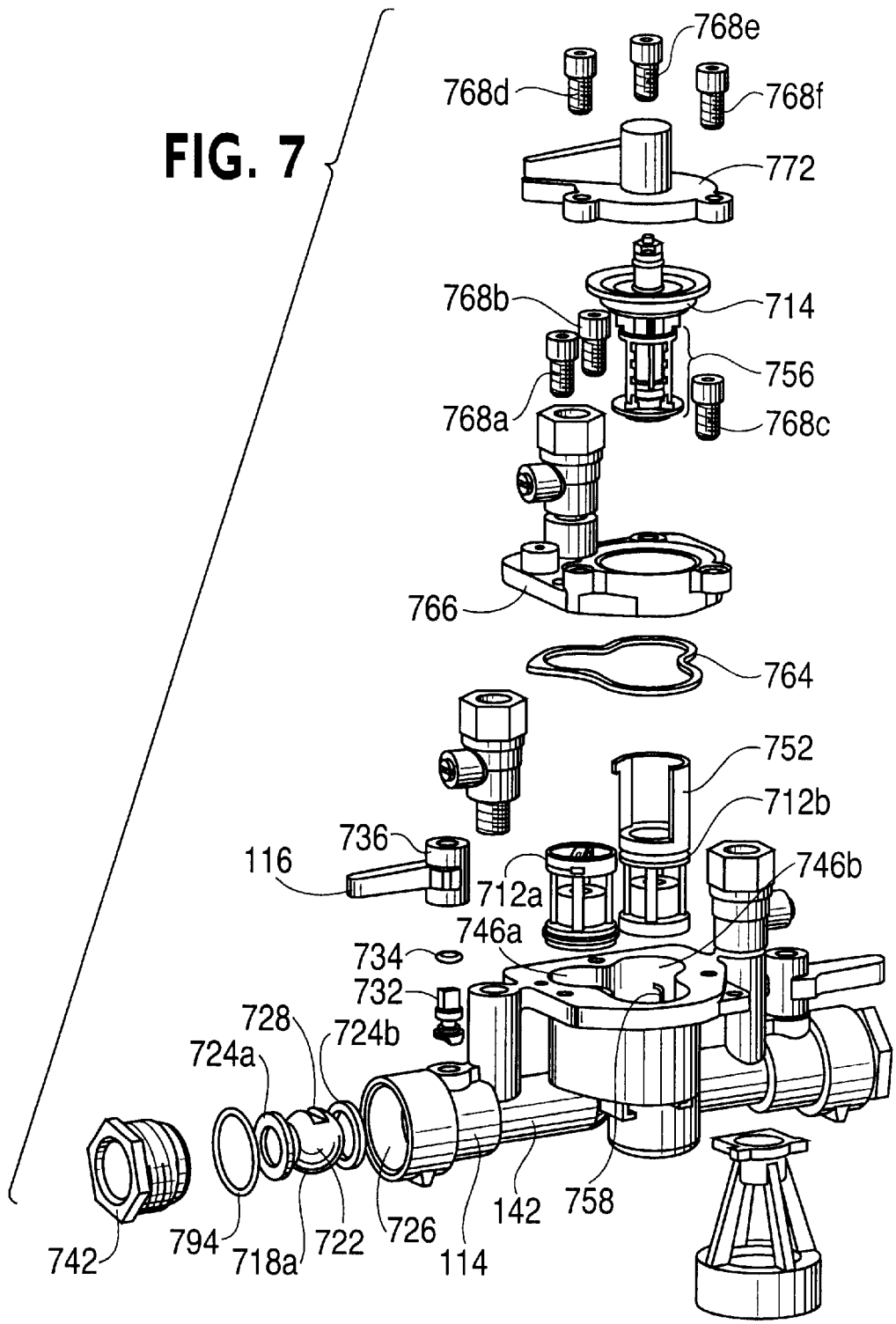
FIG. 7 is an exploded perspective view of the backflow prevention assembly of FIG. 1.

As can be seen, e.g., from FIGS. 3 and 7, a single unitary (preferably one-piece caste metal) housing 142 substantially encloses the first and second check valve modules 712a, 712b, the relief valve module 714 and the first and second stop valves 718a, 718b. Use of a single housing for enclosing all 5 valves substantially eliminates the need for a flange or other coupler for coupling one valve housing to another valve housing, reducing the overall size, volume and/or weight of the assembly, compared to previous approaches.

Preferably, the ball valve can be assembled through the inlet and outlet regions. In the embodiment of FIG. 7, the ball 722 sandwiched between ball seals 724a,b is inserted through the opening 726 into the shutoff valve housing 114, with a slot 728 aligned with the tab of the ball valve stem 732 for engagement therewith. The stem 732, sealed by an "O" ring 734 is keyed to an opening in the stem 736 of a handle 116. A tail piece 742 provided with an "O" ring 744 secures the valve ball 722 laterally. Preferably, both ball valves can be assembled in substantially the same fashion.

Figure 2:
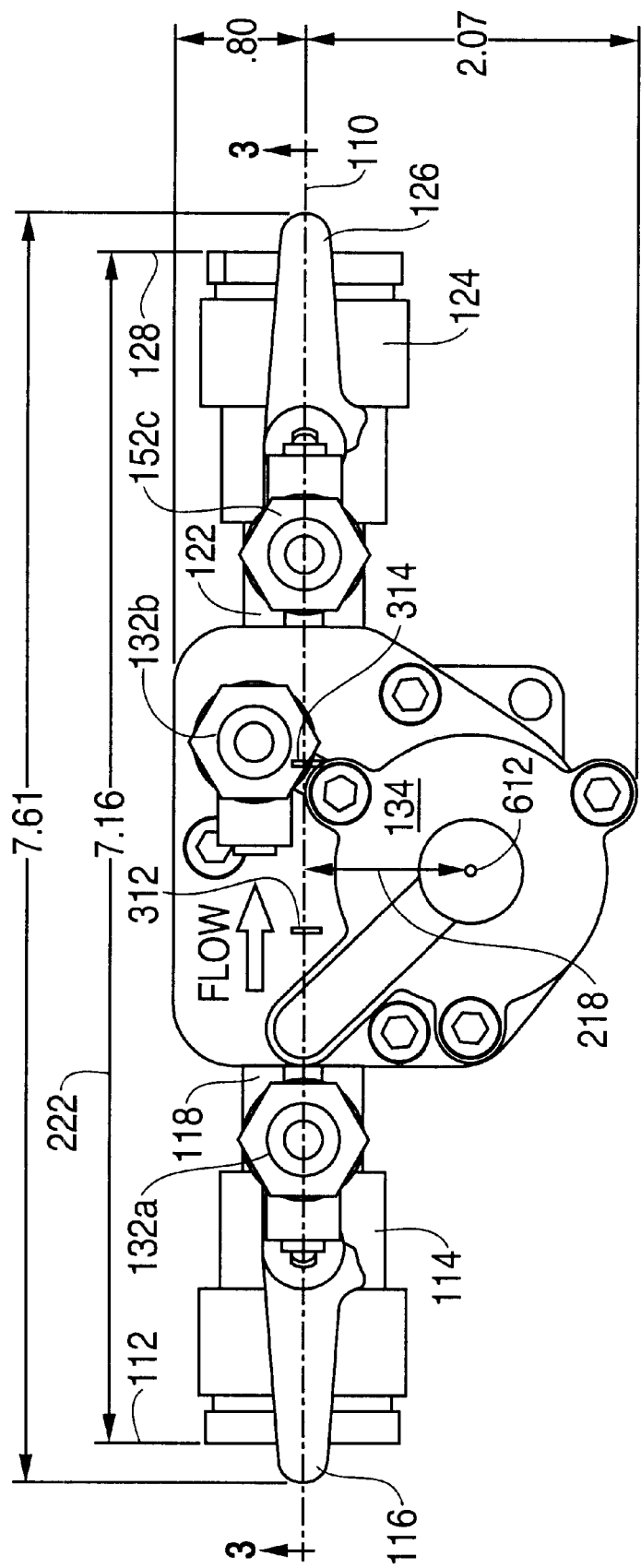
FIG. 2 is a top plan view of the backflow preventor assembly of FIG. 1.
Figure 4:
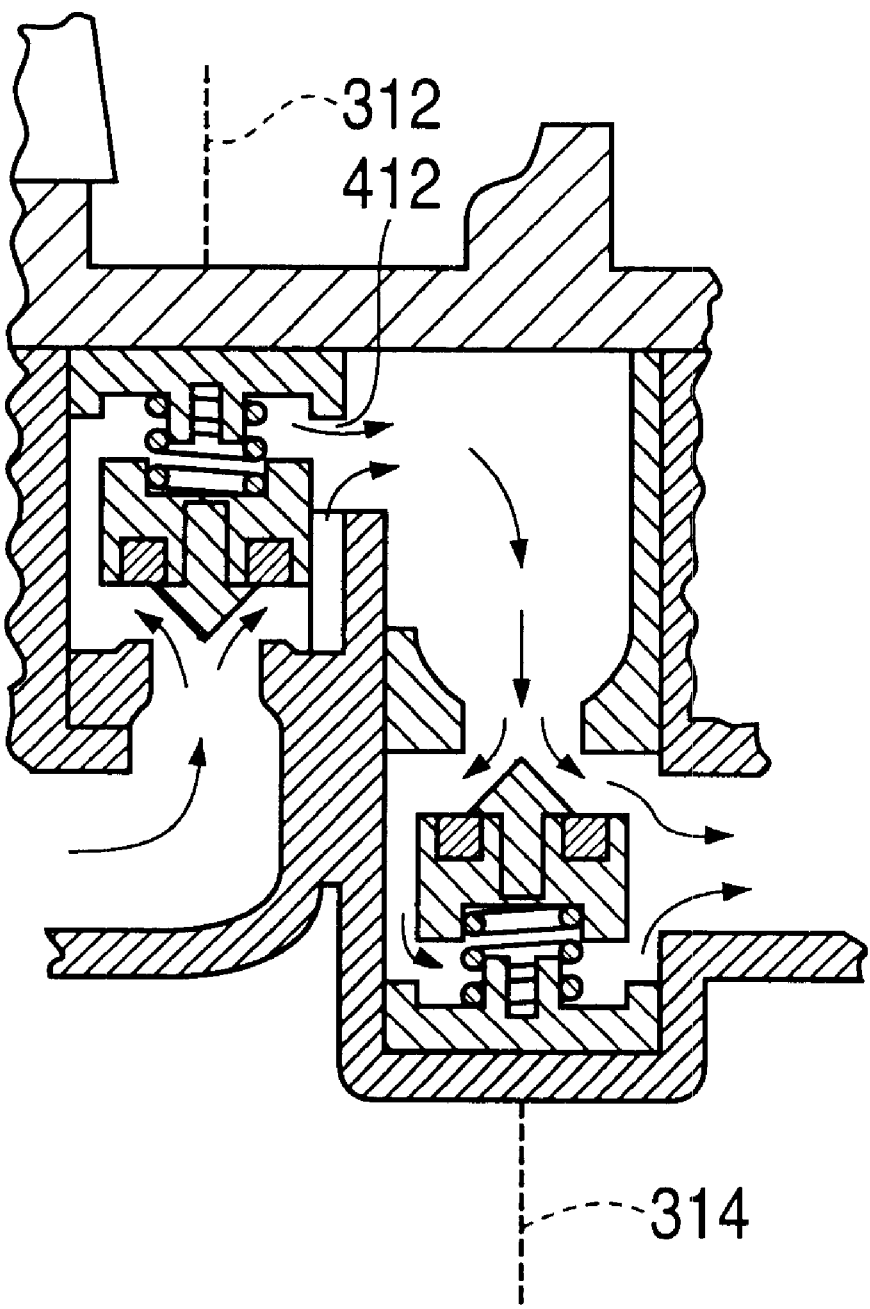
FIG. 4 is a partial cross-sectional view corresponding to the check valve portion of FIG. 3, showing the check valves in their normally open position.
Figure 5:
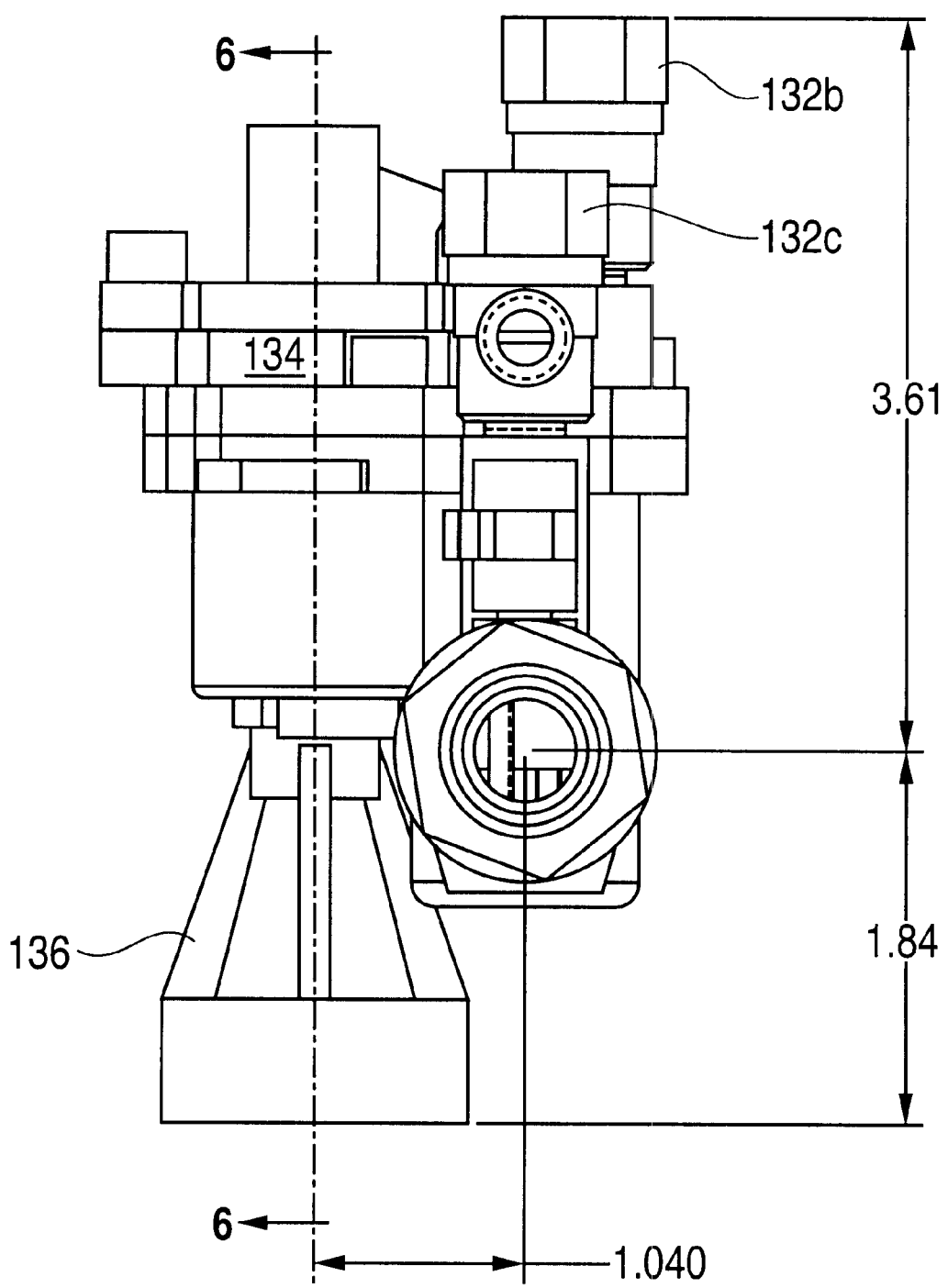
FIG. 5 is a right end view of the check valve assembly of FIG. 1.

As seen in FIG. 7, the check valve modules 712a, 712b can be inserted and removed into regions (generally cylindrical) 746a,b of the housing 142 by movement generally in a direction parallel to the movement axes 312, 314 of the valves. It is contemplated that, in general, check valve modules will be replaced as a whole (rather than repaired). However, repair can be effected if desired. The first module 712a includes a cage structure 322 sealed with an o ring 344 and coupled to a retainer cap 336. The cage and retainer can be formed of a resin such as that available from General Electric under the tradename NORYL®. Preferably the retainer 336 is assembled to (or disassembled from) the cage 332 by a tab and slot "snap" fit, so that assembly can be achieved without the use of tools. A valve disk holder 338 is urged towards the closed position (depicted in FIG. 3) by a spring 342, and disk 344 is urged into a seating relationship with the seat ring 346. In response to normal pressure and during normal use (e.g., in the absence of backflow or back pressure) the disk holder 338 is moved (against the urging of the spring 342) to the open position (FIG. 4) allowing flow therethrough. The second check valve module 712b is similar in configuration and assembly to the first module 712a except that it is positioned upside down (compared to the position of module 712a) and includes a valve inlet guide 752. As seen in FIG. 2, in the depicted embodiment, the central or movement axes 312, 314 for the first and second check valves intersect the in-line axis 110. The angle 352 between the in-line axis 110 and the first check valve movement axis 312 is substantially greater than 45°, and, in the depicted embodiment, is about 90°. In the depicted embodiment the angle between the in-line axis 110 and the movement axis of the second check valve 314 is also greater than about 45°, preferably about 90°. As depicted in FIG. 4, the average streamline flow of the fluid through the first check valve is substantially coaxial with the movement axis 312 of the first check valve and the average streamline flow of the fluid through the second check valve is substantially coaxial with the movement axis 314 of the second check. Accordingly, flow through the first check valve is substantially parallel to the flow through the second check valve. However, as depicted in FIG. 4, flow through the first check valve is substantially opposite in direction to flow through the second check valve, i.e., flow through the first check valve, in the depiction of FIG. 4 is towards the top of the page and flow through the second check valve toward the bottom of the page.

Figure 6:
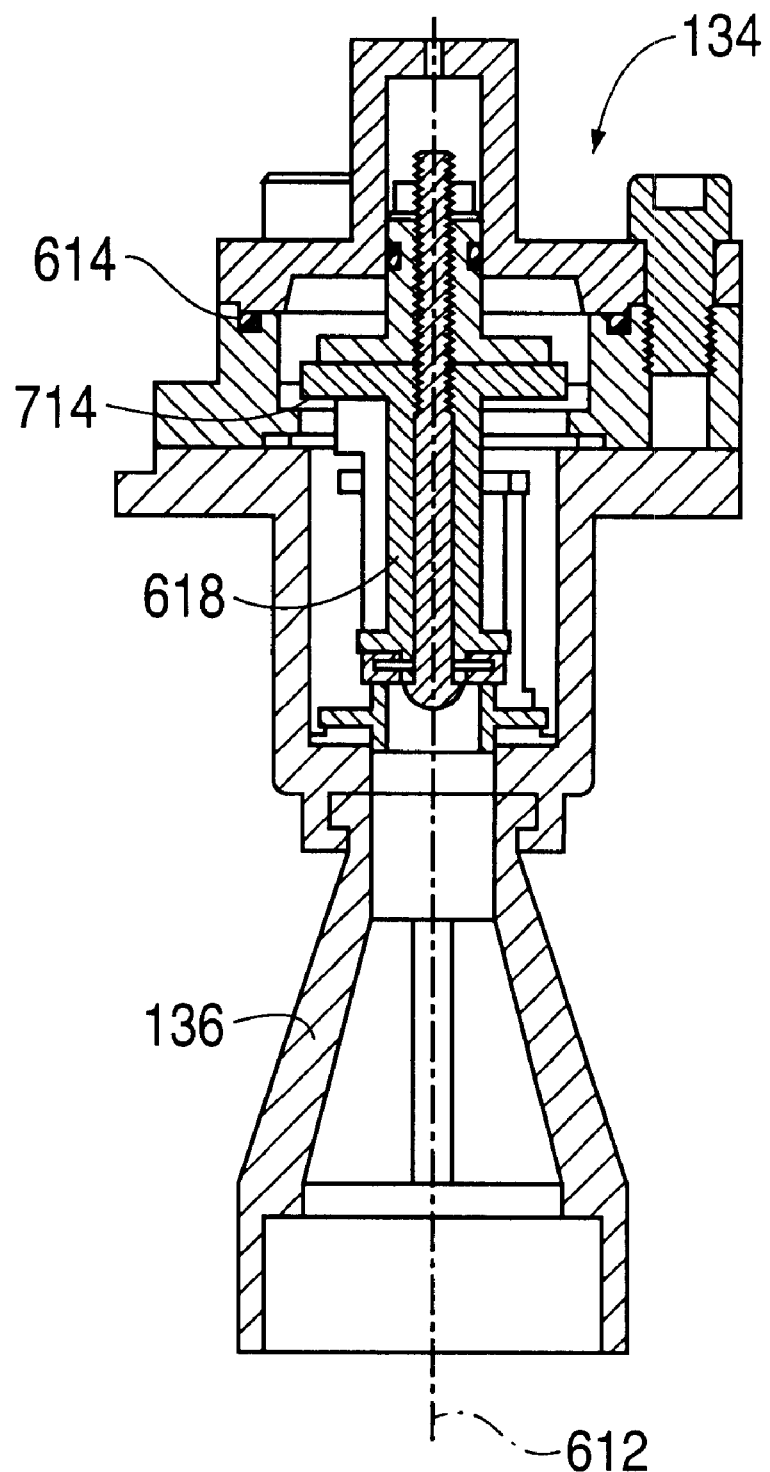
FIG. 6 is a cross-sectional view taken along lines 6—6 of FIG. 5.

Although, in the depicted embodiment, the check valves are provided as linearly-moving, divergent-flow or poppet valves, it is possible to construct embodiments which use some or all features of the present invention using other types of check valves including flap valves, rotating valves or the like. Although the depicted embodiment illustrates the use of ball valves as the stop valves (and, in at least some embodiments, ball valves are preferred, at least because they are familiar and have well known characteristics in the context of at least some backflow prevention assemblies, albeit typically being previously provided as separate-housing units) other types of devices can be used as one or both stop valves including globe valves, gate valves, butterfly valves and the like. The relief valve module 714 provides a diaphragm type relief valve mechanism such as a silicone/fabric diaphragm 614. As will be understood by those of skill in the art, at least after understanding the present invention, in response to at least a predetermined amount, or differential, of pressure, e.g., between the two check valves, the relief valve stem 618 will move along the relief valve axis 612 from the closed position depicted in FIG. 6, upwardly to an open position, allowing fluid to be released from the zone between the two check valves through the air gap drain 136. The stem region 756 of the relief valve module 714 is received in a (substantially cylindrical) housing region 758. In this position, as seen in FIG. 2, the axis of the relief valve 612, while preferably parallel to one or both of the check valve axes 312, 314 and/or perpendicular to the in-line axis 110, is offset a distance 218 from the line connecting the check valve axes 312, 314 and from the in-line axis 110. Offsetting the relief valve axis is useful not only to provide a relatively shorter length 222 (e.g., compared to a configuration in which the some or all of the relief valve width intersects the in-line axis 110) but also avoids a diversion or interruption of the flow, during normal use, along a plane parallel to the in-line axis 110. As depicted in FIG. 3, the middle axis of the average streamline flow through the assembly remains substantially in the same plane throughout the flow (the plane of the cross-sectional view of FIG. 3) and the plane also passes through the in-line axis 110. The average streamline axis will pass out of the plane of the cross section of FIG. 3 if the relief valve opens.

As seen in FIG. 7, the assembly can be assembled as follows. The stop valves are assembled as described above. The check modules 712a, 712b are positioned in the housing regions 746a, 746b. A gasket or cover seal 764 is positioned for sealing the relief valve cover 766 to the housing opening. The relief valve module 714 is positioned in the relief valve region 758. The relief valve cover is held in place by connectors such as cap screws 768a,b,c. The upper plate 772 covers the upper portion of the relief valve module 714 and is coupled by additional cap screws 768d,e,f.

When it is desired to inspect, repair or replace components of the assembly, the cap screws 768a,b,c,d,e,f are removed and the covers 772 and 766 and the relief valve module 714 can be lifted off the upper part of the housing 142. The check valve module 712a, 712b can be pulled, e.g., manually, from the housing recesses 746a, 746b, e.g., for inspection, replacement and the like. Accordingly, inspection, replacement and the like of the relief valve and/or the check valves can be achieved by removing six screw connectors 768a–f (e.g., using a wrench, nutdriver, screwdriver or the like) and, thereafter, all additional disassembly, inspection of replacement and the like can be achieved without the use of tools, if desired.

During normal use, water or other fluid enters 152 (FIG. 3) the inlet opening 154 and travels substantially along the in-line axis 110 until it reaches substantially the position of the first check valve. The flow then moves vertically upward (in the view of FIG. 4) through the first check valve, laterally (to the right, in the view of FIG. 4) to the position of the second check valve, and then vertically downward through the second check valve. The flow then moves laterally through the second conduit 122 (to the right in the view of FIG. 3) through the second stop valve and out the outlet opening 158. If there is a tendency to backflow, and/or if the pressure at the second check valve is not at least a predetermined amount less than the pressure of the first check valve, one or, preferably both, check valves will close (i.e., move to the position depicted in FIG. 3) under the urging of the springs. If the pressure in the zone between the two check valves is sufficiently high (or if there is a sufficiently high pressure differential with respect to the inlet pressure) the relief valve will open, as described above. If desired (such as in a situation where failure of backflow prevention operation is suspected or detected, or for purposes of performing maintenance, inspection and the like) one, or generally both, stop valve handles will be rotated 90° to rotate the ball valves to a closed position.

In light of the above description, a number of advantages of the present invention can be seen. The present invention can provide backflow prevention functions, preferably in accordance with backflow prevention regulations, codes and/or definitions in a device having a length, volume and/or weight which is lessened or reduced compared to typical previous backflow prevention approaches. The present invention provides an in-line configuration with features that are especially (though not exclusively) useful in the context of low-pressure and/or small-diameter applications such as point-of-use applications, including in-line installation, relative ease of inspection, repair, replacement and the like, particularly when space or volume for inspection, repair or replacement operations is limited as is often the situation in point-of-use applications). The present invention can assist in reducing the cost of designing, fabricating, installing, maintaining, servicing, and/or repairing reduced-pressure, double check valve backflow prevention devices, particularly in the context of small-diameter or low-pressure applications.

A number of variations and modifications of the invention can be used. It is possible to use some features of the invention without using others. For example, it is possible (although not necessarily economically advisable) to provide a backflow prevention device which is in-line with parallel check valves positioned perpendicular to the in-line axis, without using a common housing for both stop valves. Although the backflow preventor of the present invention is believed especially useful in small-diameter and/or a low-pressure applications, such as point-of-use applications, it is also possible to use some or all features of the present invention in other applications including larger-diameter, higher pressure applications, some or all service connection applications and the like. Although valve seats and cover components are described as preferably formed of brass, other materials can be used including other metals such as stainless steel or other steel, iron, copper or copper plating, non-metallic materials including plastics, resins, fiberglass, ceramics, composites, coated and plated materials and the like.

The present invention, in various embodiments, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, includes providing devices and processes in the absence of items not depicted and/or described herein or in various embodiments hereof, including in the absence of such items as may have been used in previous devices or processes, e.g. for improving performance, achieving ease and/or reducing cost of implementation. The present invention includes items which are novel, and terminology adapted from previous and/or analogous technologies, for convenience in describing novel items or processes, do not necessarily retain all aspects of conventional usage of such terminology.

The foregoing discussion of the invention has been presented for purposes of illustration and description. The foregoing is not intended to limit the invention to the form or forms disclosed herein. Although the description of the invention has included description of one or more embodiments and certain variations and modifications, other variations and modifications are within the scope of the invention, e.g. as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A double check valve, reduced-pressure backflow preventor assembly comprising:

a single housing having an in-line axis and defining an inlet opening having a first inlet direction and an outlet opening having a second outlet direction, coaxial with said first inlet direction;

first and second serially-connected check valves respectively defining first and second check valve movement axes wherein said first and second check valve movement axes define first and second angles, respectively, with respect to said in-line axis, each of said first and second angles being substantially greater than 45°; and a first stop valve between said inlet opening and said first check valve; and a second stop valve between said second check valve and said outlet opening, wherein said single housing substantially encloses said first and said second check valve and said first and second stop valves.

2. An assembly, as claimed in claim 1, wherein each of said first and second angles is substantially 90°.

3. An assembly, as claimed in claim 1, wherein said first and second check valve movement axes are substantially parallel.

4. An assembly, as claimed in claim 3, wherein said first check valve defines fluid flow through said first check valve in a first direction and said second check valve defines fluid flow through said second check valve in a direction opposite to said first direction.

5. An assembly, as claimed in claim 1, wherein said assembly further comprises a relief valve configured to controllably release fluid to a region exterior to said assembly.

6. An assembly, as claimed in claim 5, wherein said relief valve has at least a portion movable, along a relief valve axis, from a first closed-valve position to a second open-valve position.

7. An assembly, as claimed in claim 6, wherein said relief valve axis is substantially perpendicular to said in-line axis.

8. An assembly, as claimed in claim 6, wherein said relief valve axis is spaced from said in-line axis.

9. An assembly, as claimed in claim 1, wherein said first and second check valve movement axes each intersect said in-line axis.

10. An assembly, as claimed in claim 1, wherein said stop valves comprise ball valves.

11. A method for backflow prevention between a flow source and coaxial flow sink defining a flow axis comprising:

positioning first and second check valves within a single housing having an inlet and an outlet, to define first and second check valve movement axes wherein said first and second check valve movement axes define first and second angles, respectively, with respect to an in-line axis of said single housing defined by coaxial inlet and outlet axes, each of said first and second angles being substantially greater than 45°;

positioning a first stop valve between inlet and said first check valve;

positioning a second stop valve between said second check valve and said outlet; and coupling said single housing such that said inline axis is coaxial with said flow axis, wherein said first and second check valves and said first and second stop valves are positioned within said single housing.

12. A method as claimed in claim 11 wherein said step of positioning said first and second valves comprises positioning said first and second check valves such that each of said first and second angles is substantially 90°.

13. A method as claimed in claim 11 wherein said step of positioning said first and second check valves comprises positioning said first and second check valves such that said movement axes are substantially parallel.

14. A method as claimed in claim 11 wherein further comprising:

positioning a relief valve at least partially within said housing, said relief valve configured to controllably release fluid to a region exterior to said assembly.

15. A method as claimed in claim 14 wherein said relief valve has at least a portion moveable along a relief valve axis from a first closed-valve position to a second open-valve position.

16. A method as claimed in claim 14 wherein said step of positioning said relief valve comprises positioning said relief valve such that said relief valve axis is substantially perpendicular to said in-line axis.

17. A method as claimed in claim 15 wherein said relief valve is positioned such that said relief valve axis is spaced from said in-line axis.

18. A double check valve, reduced-pressure backflow preventor assembly comprising:

a single housing having an inlet means for defining a first inlet direction and an outlet means for defining a second, coaxial, outlet direction;

first receiving means in said single housing for receiving a first check valve to define a first check valve axis and a second receiving means to receive a second check valve defining a second check valve axis, wherein said first and second check valve axes define first and second angles, respectively, with respect to an inline axis which lies along said first inlet direction and second outlet direction, each of said first and second angles being substantially greater than 45°;

third receiving means in said single housing for receiving a first stop valve between said inlet means and said first check valve; and fourth receiving means in said single housing for receiving a second stop valve between said second check valve and said outlet means.

19. An assembly as claimed in claim 18 wherein each of said first and second angles is substantially 90°.

20. An assembly as claimed in claim 18 wherein said first and second check valve axes are substantially parallel.

21. An assembly as claimed in claim 18 wherein said first receiving means is configured to position said first check valve to define fluid flow through said first check valve in a first direction and wherein said second receiving means is configured to position said second check valve to define fluid flow through said second check valve in a direction opposite to said first direction.

22. An assembly as claimed in claim 18 further comprising a fifth receiving means for receiving a relief valve, said relief valve being configured to controllably release fluid to a region exterior to said assembly.

23. An apparatus as claimed in claim 22 wherein said relief valve has at least a portion moveable, along a relief valve axis, from a first closed-valve position to a second open-valve position.

24. An apparatus as claimed in claim 23 wherein said relief valve axis is substantially perpendicular to said in-line axis.

25. An assembly as claimed in claim 23 wherein said relief valve axis is spaced from said in-line axis.

26. An assembly as claimed in claim 18 wherein said first and second check valve axes intersect said in-line axis.

27. An assembly as claimed in claim 18 wherein said stop valves comprise ball valves.

28. An assembly as claimed in claim 18 wherein said first and second stop valves define flow axes coaxial with said in-line axis.

\* \* \* \* \*